(12) United States Patent
Yamamura et al.

(10) Patent No.: US 10,326,954 B2
(45) Date of Patent: Jun. 18, 2019

(54) IMAGE SENSOR FOR FOCUS DETECTION

(71) Applicant: SONY CORPORATION, Tokyo (JP)

(72) Inventors: Takaya Yamamura, Kanagawa (JP); Yoshitaka Miyatani, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/506,039

(22) PCT Filed: Jun. 9, 2015

(86) PCT No.: PCT/JP2015/002883
§ 371 (c)(1),
(2) Date: Feb. 23, 2017

(87) PCT Pub. No.: WO2016/038766
PCT Pub. Date: Mar. 17, 2016

(65) Prior Publication Data
US 2017/0264842 A1    Sep. 14, 2017

(30) Foreign Application Priority Data

Sep. 8, 2014   (JP) ................................ 2014-182195

(51) Int. Cl.
| | |
|---|---|
| *H04N 5/369* | (2011.01) |
| *H04N 5/232* | (2006.01) |
| *H04N 9/04* | (2006.01) |

(52) U.S. Cl.
CPC ..... *H04N 5/36961* (2018.08); *H04N 5/23212* (2013.01); *H04N 5/3696* (2013.01); *H04N 9/045* (2013.01)

(58) Field of Classification Search
CPC .. H04N 5/3696; H04N 9/045; H04N 5/23212; H04N 5/36961
See application file for complete search history.

(56) References Cited

U.S. PATENT DOCUMENTS

| | | | |
|---|---|---|---|
| 2007/0237511 A1 | 10/2007 | Kusaka | |
| 2011/0085785 A1 | 4/2011 | Ishii | |
| 2012/0268634 A1* | 10/2012 | Fukuda | H01L 27/14605 348/302 |
| 2012/0300104 A1 | 11/2012 | Onuki et al. | |

FOREIGN PATENT DOCUMENTS

| | | |
|---|---|---|
| JP | 2005-106994 A | 4/2005 |
| JP | 2009-015164 A | 1/2009 |
| JP | 2009-162847 A | 7/2009 |
| JP | 2010-093757 A | 4/2010 |
| JP | 2012-230172 A | 11/2012 |

* cited by examiner

*Primary Examiner* — Albert H Cutler
(74) *Attorney, Agent, or Firm* — Chip Law Group

(57) ABSTRACT

An image sensor includes: a plurality of large-defocus detection pixel pairs configured to be used when a displacement of a focus is greater than a predetermined value; and a plurality of normal pixels arranged in a substantially matrix shape and configured to acquire an image. A large-defocus detection line including the large-defocus detection pixel pairs is provided for each of a predetermined number of lines, and on each of the large-defocus detection lines, the plurality of large-defocus detection pixel pairs are configured as a plurality of exit pupil distance-supporting large-defocus detection pixel pairs corresponding to different exit pupil distances.

8 Claims, 14 Drawing Sheets

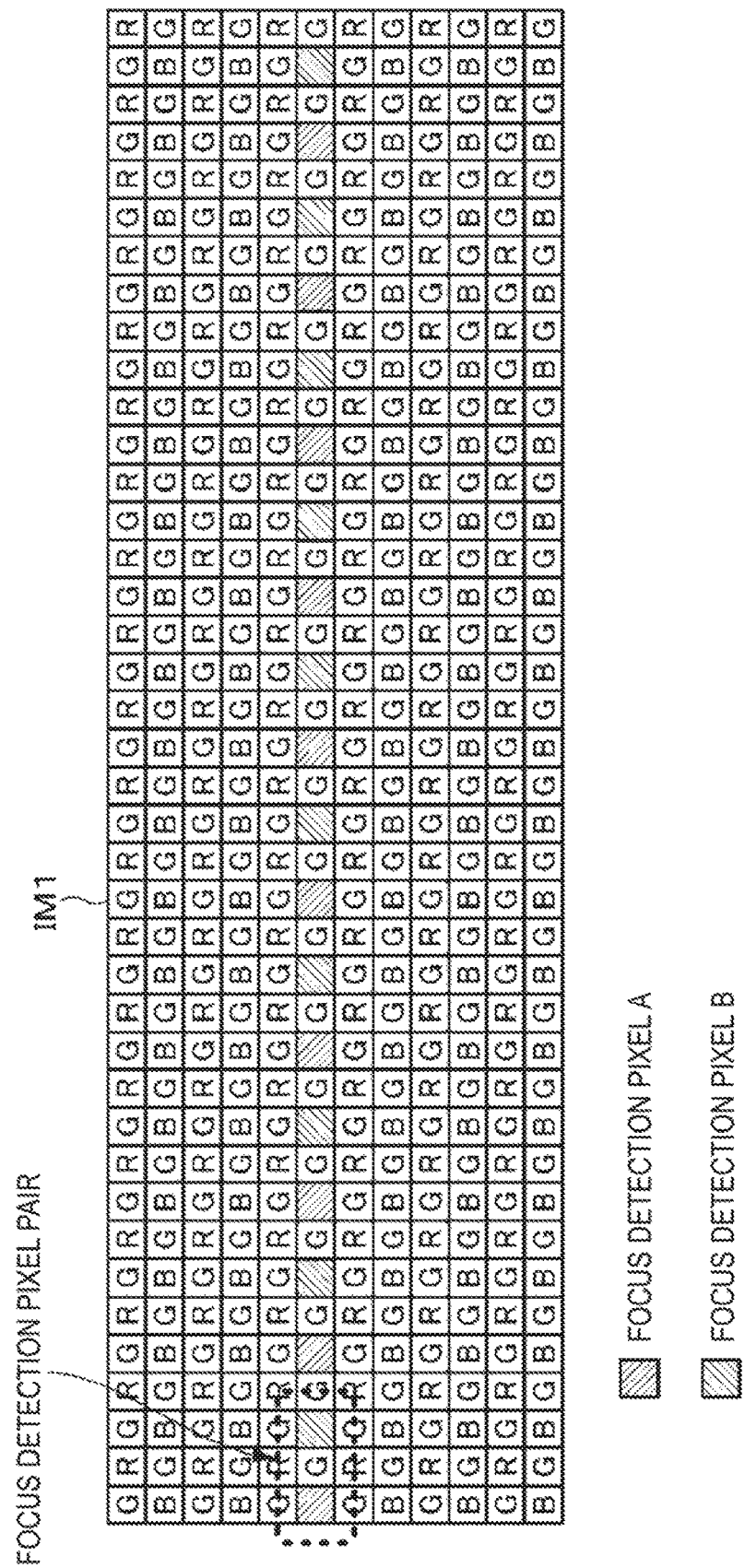

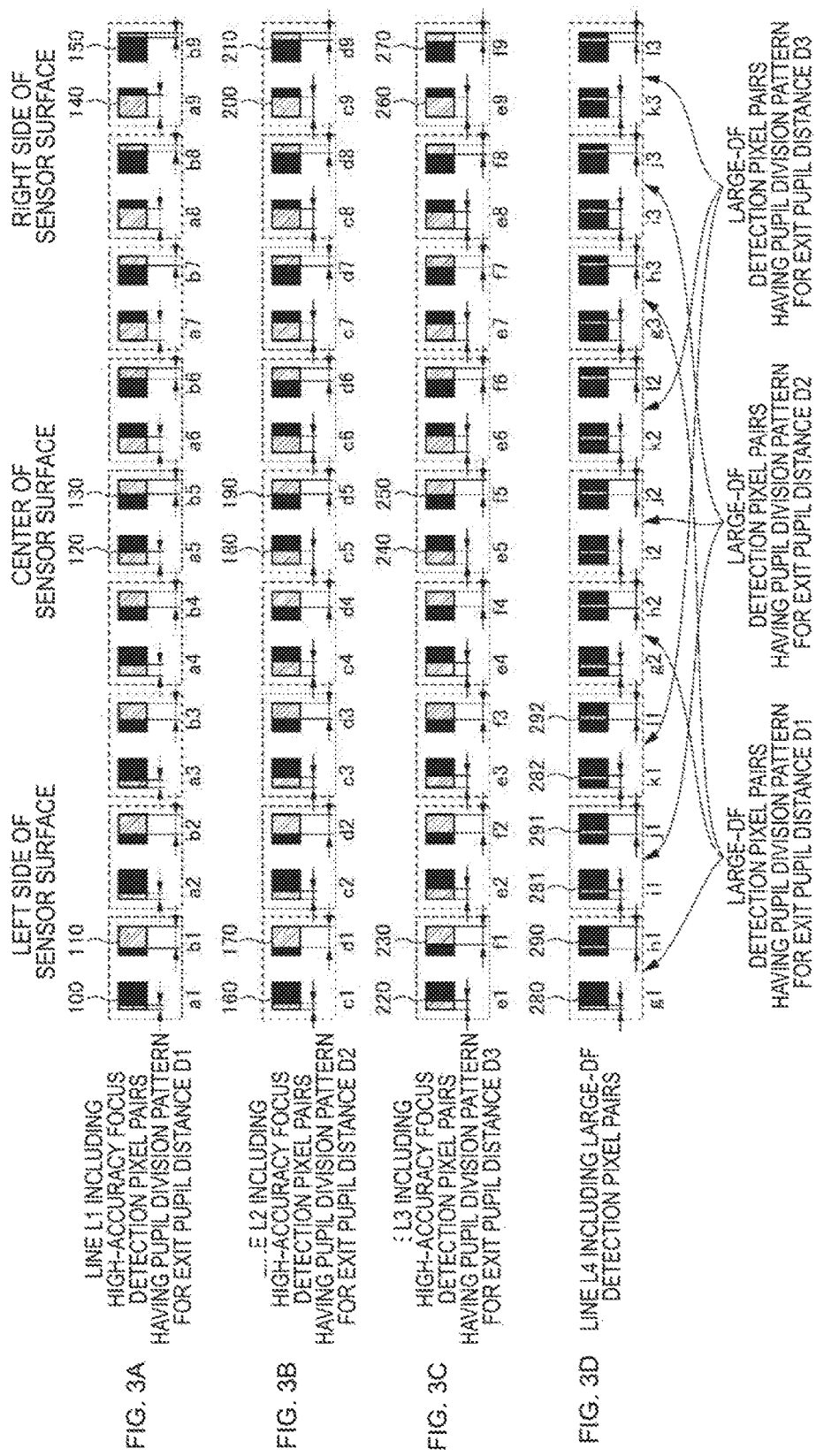

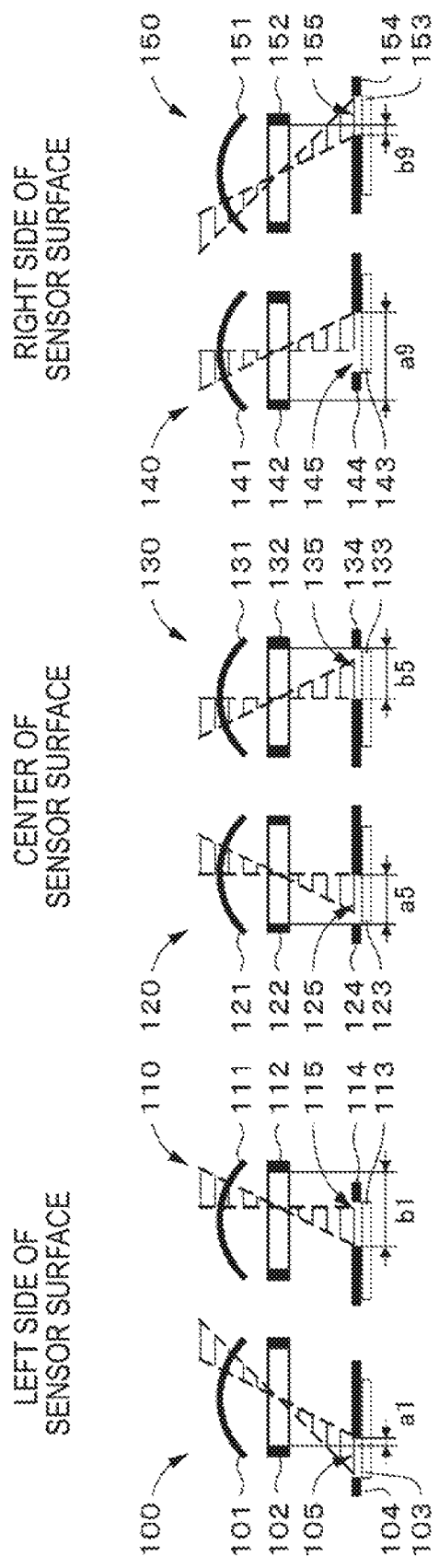

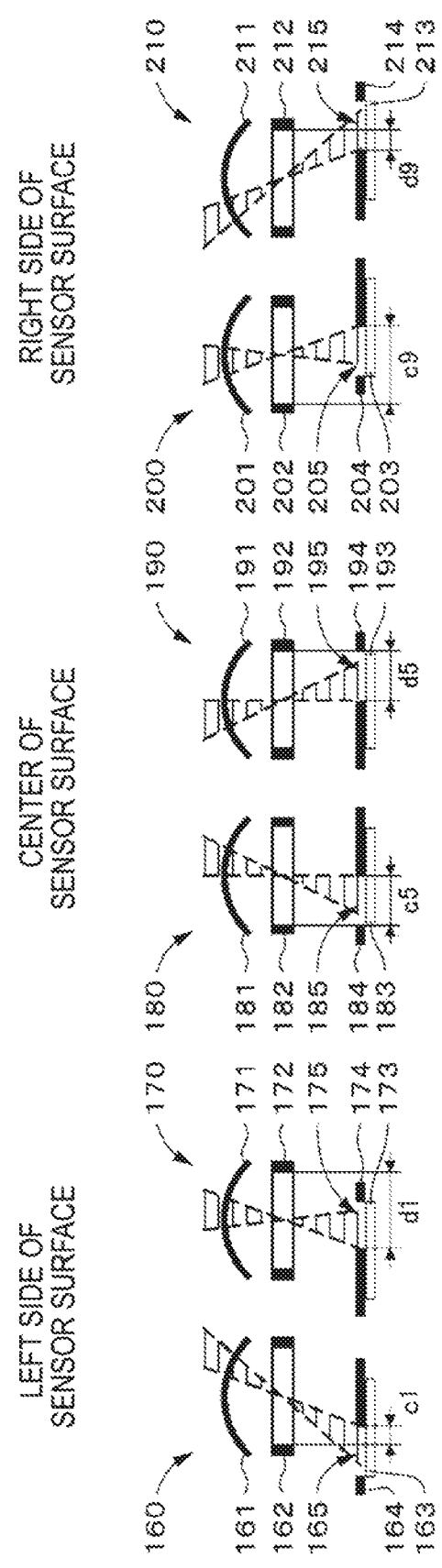

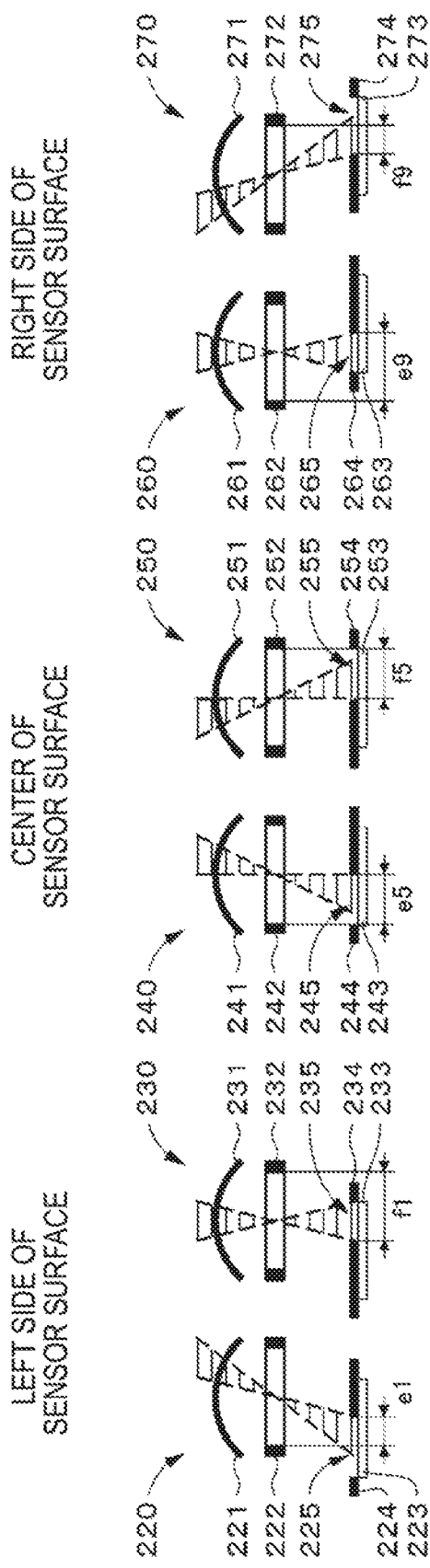

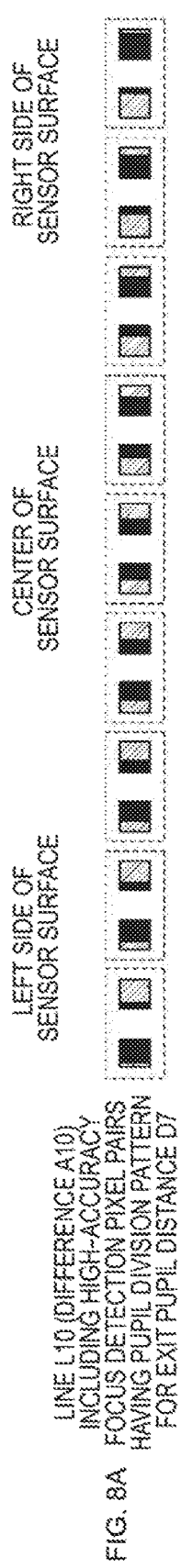

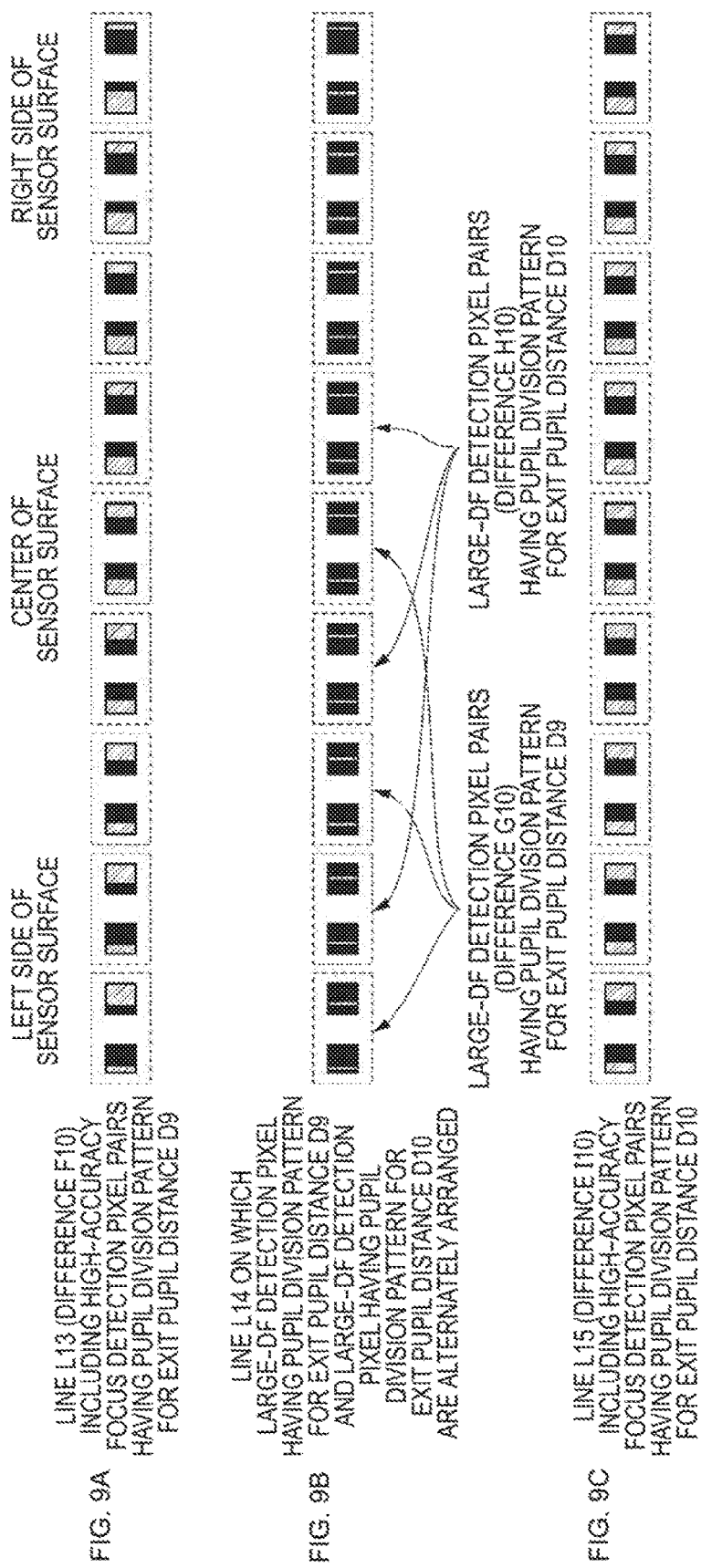

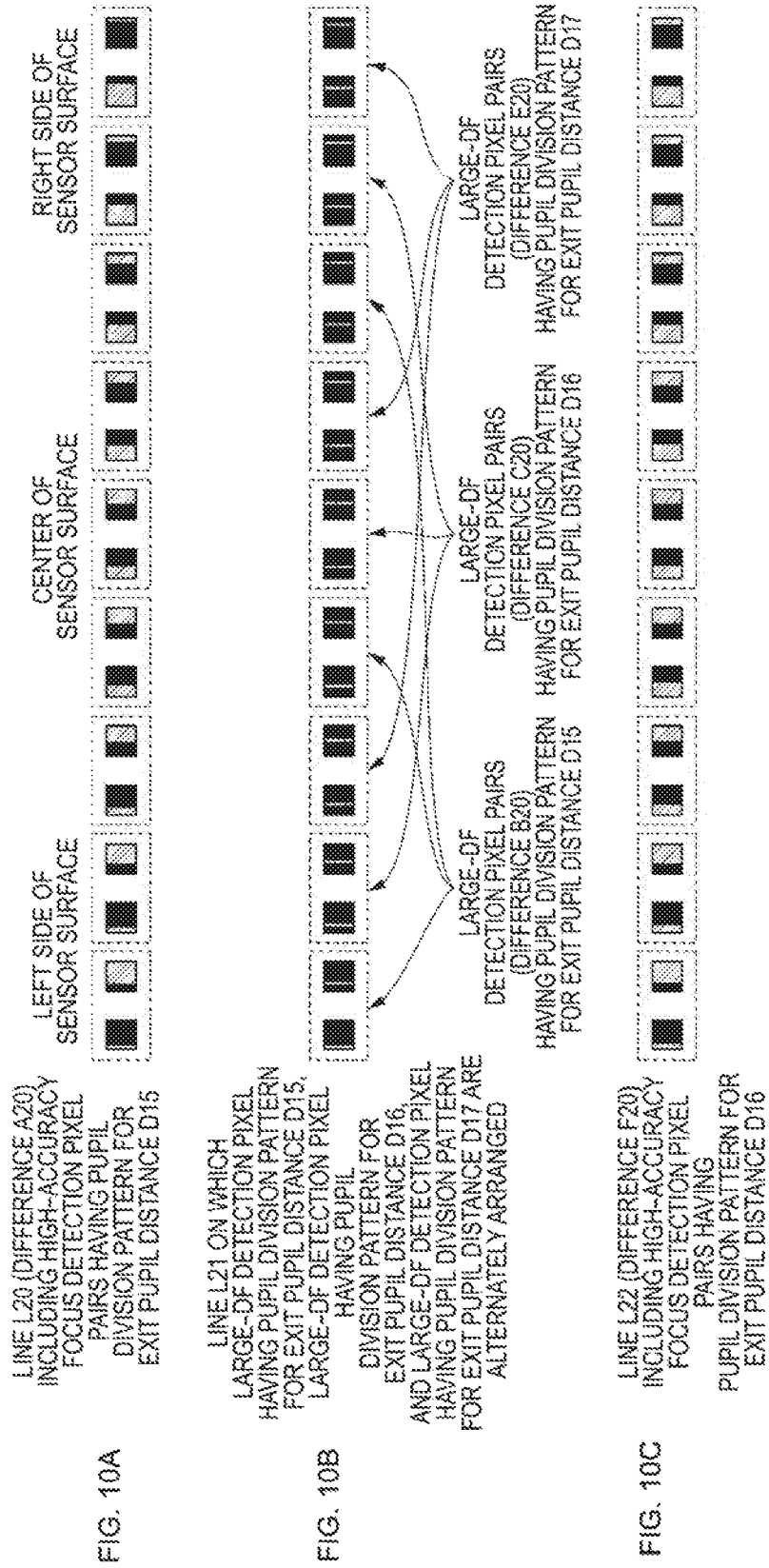

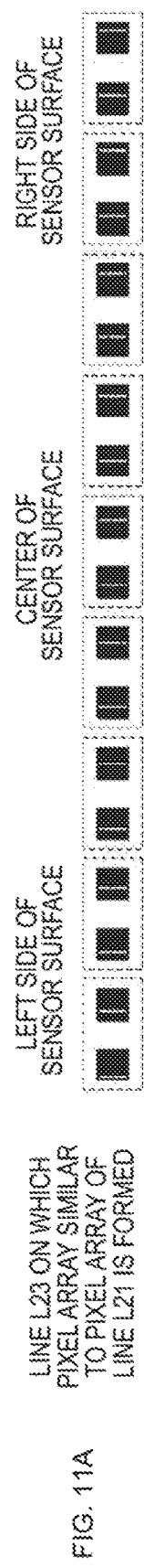
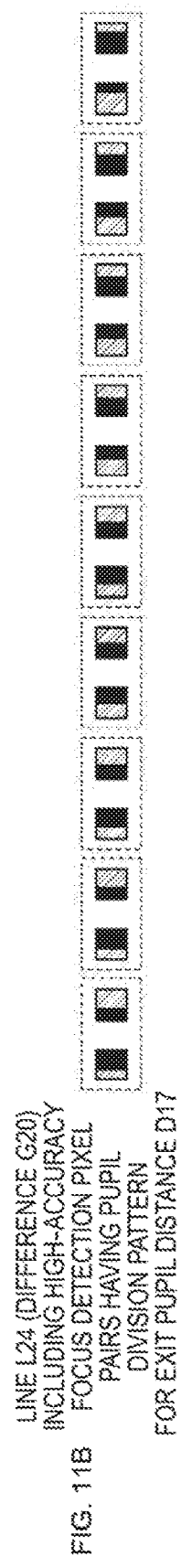
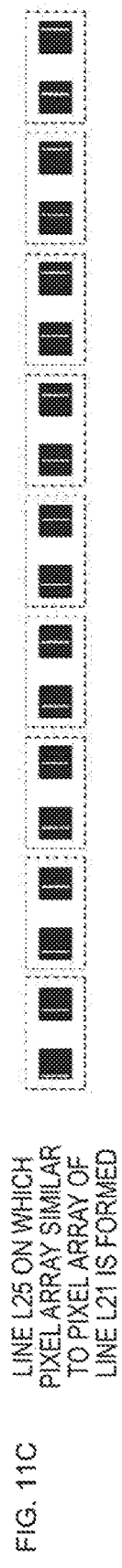
FIG. 11A  LINE L23 ON WHICH PIXEL ARRAY SIMILAR TO PIXEL ARRAY OF LINE L21 IS FORMED
FIG. 11B  LINE L24 (DIFFERENCE G20) INCLUDING HIGH-ACCURACY FOCUS DETECTION PIXEL PAIRS HAVING PUPIL DIVISION PATTERN FOR EXIT PUPIL DISTANCE D17
FIG. 11C  LINE L25 ON WHICH PIXEL ARRAY SIMILAR TO PIXEL ARRAY OF LINE L21 IS FORMED

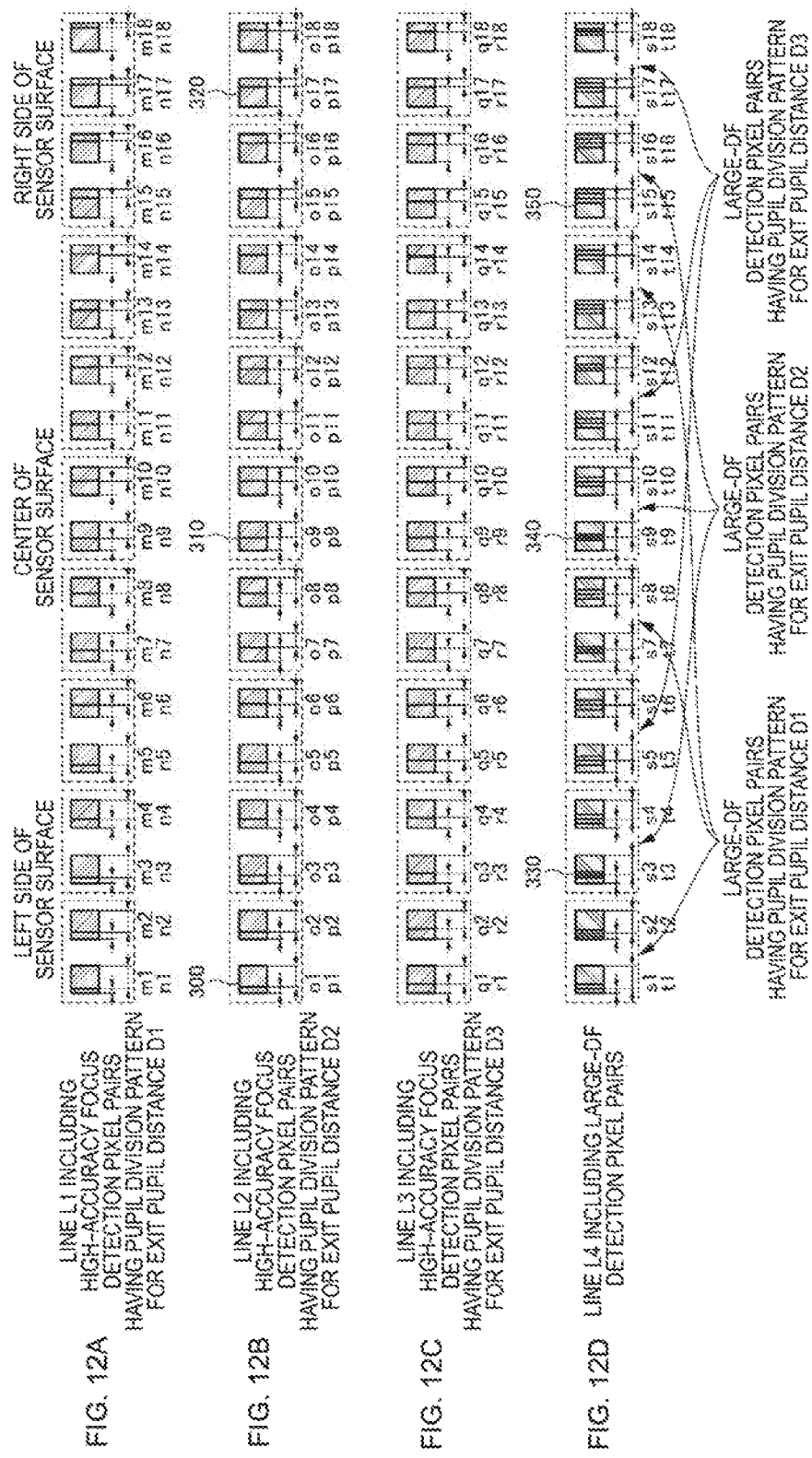

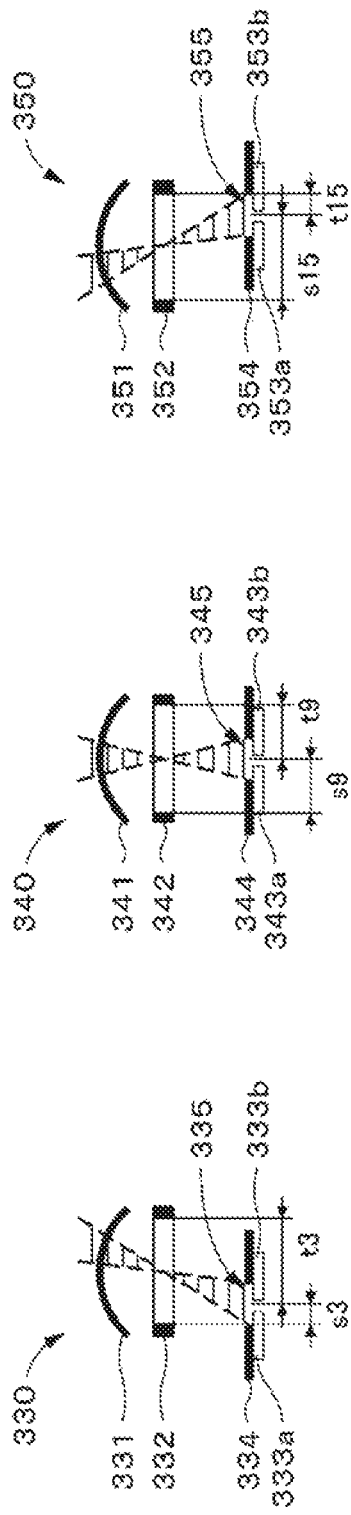

IMAGE SENSOR FOR FOCUS DETECTION

CROSS REFERENCE TO RELATED APPLICATIONS

This application is a U.S. National Phase of International Patent Application No PCT/JP2015/002883 filed on Jun. 9, 2015, which claims priority benefit of Japanese Patent Application No. JP 2014-182195 filed in the Japan Patent Office on Sep. 8, 2014. Each of the above-referenced applications is hereby incorporated herein by reference in its entirety.

TECHNICAL FIELD

The present disclosure relates to image sensors.

BACKGROUND ART

Among the proposed techniques of detecting a focus is a focal plane phase detection technique. In the focal plane phase detection technique, focus detection pixels for detecting a focus as well as normal pixels are provided on the same image sensor, as described in, for example, Patent Literature 1 below.

CITATION LIST

Patent Literature

Patent Literature 1: JP 2007-279312A

DISCLOSURE OF INVENTION

Technical Problem

It is desirable that the accuracy of focus detection by the focal plane phase detection technique should be improved.

It is an object of the present disclosure to provide an image sensor with improved focus detection accuracy.

Solution to Problem

In order to solve the above-mentioned problem, the present disclosure provides an image sensor including: a plurality of large-defocus detection pixel pairs configured to be used when a displacement of a focus is greater than a predetermined value; and a plurality of normal pixels arranged in a substantially matrix shape and configured to acquire an image. A large-defocus detection line including the large-defocus detection pixel pairs is provided for each of a predetermined number of lines, and on each of the large-defocus detection lines, the plurality of large-defocus detection pixel pairs are configured as a plurality of exit pupil distance-supporting large-defocus detection pixel pairs corresponding to different exit pupil distances.

Advantageous Effects of Invention

According to at least one embodiment, the focus detection accuracy can be improved. Note that the effects described here are not necessarily limitative. Any effect described herein may be achieved. The illustrated effects should not be construed as limiting the present disclosure.

BRIEF DESCRIPTION OF DRAWINGS

FIG. 1 is a diagram for describing an example of a focal plane phase detection technique.

FIG. 3A, FIG. 3B, and FIG. 3C are diagrams schematically showing high-accuracy focus detection pixel pairs provided on an image sensor, and FIG. 3D is a diagram schematically showing a group of large-DF detection pixels provided on an image sensor.

FIG. 4A, FIG. 4B, and FIG. 4C are diagrams for describing a configuration example of high-accuracy focus detection pixels provided on a predetermined line of an image sensor.

FIG. 5A, FIG. 5B, and FIG. 5C are diagrams for describing a configuration example of high-accuracy focus detection pixels provided on a predetermined line of an image sensor.

FIG. 6A, FIG. 6B, and FIG. 6C are diagrams for describing a configuration example of high-accuracy focus detection pixels provided on a predetermined line of an image sensor.

FIG. 8A, FIG. 8B, and FIG. 8C are diagrams for describing Variation 1.

FIG. 9A, FIG. 9B, and FIG. 9C are diagrams for describing Variation 1.

FIG. 10A, FIG. 10B, and FIG. 10C are diagrams for describing Variation 2.

FIG. 11A, FIG. 11B, and FIG. 11C are diagrams for describing Variation 2.

FIG. 12A, FIG. 12B, FIG. 12C, and FIG. 12D are diagrams for describing Variation 3.

FIG. 14A, FIG. 14B, and FIG. 14C are diagrams for describing Variation 3.

MODE(S) FOR CARRYING OUT THE INVENTION

Figure 2A:
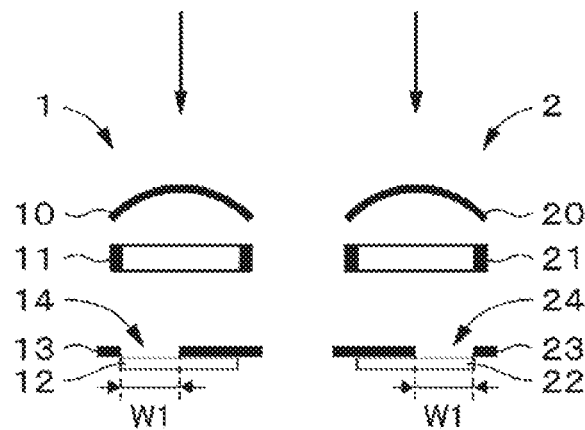
FIG. 2A and FIG. 2B are diagrams for describing a difference between a high-accuracy focus detection pixel and a large-DF detection pixel.

Embodiments of the present disclosure will now be described with reference to the accompanying drawings. Note that description will be provided in the following order.
<1. Embodiments>
<2. Variations>

Embodiments and the like described below are preferred specific examples of the present disclosure, which are not intended to limit the present disclosure.

"Configuration of Image Sensor in Focal Plane Phase Detection Technique"

Firstly, a configuration example of an image sensor used when a focus detection scheme is performed using a focal plane phase detection technique will be roughly described with reference to FIG. 1 for ease of understanding of the present disclosure. Note that FIG. 1 shows a portion of the image sensor (image sensor IM1).

The image sensor IM1 has a configuration in which a plurality of pixels are arranged in a horizontal direction and in a vertical direction. Each pixel included in the image sensor IM1 has, for example, a configuration in which an on-chip lens, a color filter, and a photodiode are arranged in that order in a direction in which light enters. The color filter has a typical Bayer array of three primary-color filters, i.e. green (G), blue (B), and red (R). Note that the color filter in the present disclosure is not limited to the primary-color filters in the Bayer array, and may be complementary-color filters, i.e. green (G), yellow (Ye), magenta (Mg), and cyan (Cy). Alternatively, a portion of the Bayer array may be white (W), or the configuration of the color filter may be removed.

As shown in FIG. 1, focus detection pixels as well as G-pixels are provided on a predetermined line in the image sensor IM1. More specifically, a plurality of focus detection pixel pairs (each pair including a focus detection pixel A and a focus detection pixel B) are provided on the predetermined line in the image sensor IM1, so that the focus detection pixel pairs are formed. Each focus detection pixel is configured so that a portion of the focus detection pixel is shielded from light by a light shield mask, and light enters the photodiode through a portion (opening) of the focus detection pixel which is not shielded from light.

Light which has passed through an imaging lens is subjected to pupil division by each focus detection pixel pair, and the outputs of a plurality of focus detection pixels A and the outputs of a plurality of focus detection pixels B are integrated separately to generate a pair of images (e.g., output waveforms). By measuring a difference between the pair of images (displacement amount between the images) (detecting a phase difference), the degree of focus can be detected. In the process of detecting the degree of focus, a correction process which is performed, taking into consideration optical conditions such as the f-number of an imaging lens and the like, an amplification process of amplifying an output waveform, or the like, may be performed.

Incidentally, the focus detection pixel typically has a pupil division pattern most suitable for a certain assumed exit pupil distance (EPD). For example, the focus detection pixel has a pupil division pattern most suitable for the exit pupil distance of a general-purpose imaging lens. Note that an exit pupil distances corresponding to an imaging lens may be previously stored in the body of an imaging device, or alternatively, when an imaging lens is interchangeable, the exit pupil distance may be sent from the interchangeable imaging lens to an imaging device by communication or the like.

Unless the exit pupil distance of an imaging lens is equal to what is assumed, or the focus detection pixel and an imaging lens have equal exit pupil distances, i.e., for example, if the exit pupil distances are not exactly equal to each other due to an error occurring during manufacture, interchangeable lenses, or the like, the focus detection pixel pair (the focus detection pixel A and the focus detection pixel B) receives substantially equal amounts of light. Meanwhile, if the exit pupil distance of an imaging lens is shorter or longer than what is assumed, the focus detection pixel pair receives substantially equal amounts of light in the vicinity of the center of the line, while the focus detection pixel pair receives unequal amounts of light in the vicinity of an end portion of the image sensor IM1. If the focus detection pixel A and the focus detection pixel B receive unequal amounts of light, the focus detection pixel A and the focus detection pixel B have unequal sizes of an output waveform, and therefore, a significant error occurs when a distance at which the two waveforms are equal to each other is calculated, resulting in a reduction in focus detection accuracy. Therefore, it is desirable that not only a single exit pupil distance but also a plurality of exit pupil distances should be assumed, and a focus detection pixel pair having a pupil division pattern most suitable for each exit detection distance should be formed on the image sensor.

Incidentally, the above focus detection pixel A and focus detection pixel B have an opening which is formed by the light shield mask and has a great width (opening width). In addition, the distance between the center-of-gravity positions of the openings of the focus detection pixel A and the focus detection pixel B is long. Therefore, the sensitivity to the displacement amount of a pair of images (image displacement amount) caused by defocus can be enhanced so that a small degree of defocus can be detected. By contrast, when there is a high degree of defocus (large defocus), the image displacement amount is excessive, and therefore, the image displacement amount exceeds the focus detection range, so that the focus position cannot be accurately detected, i.e. the focus detection accuracy is likely to decrease in the case of large defocus, which is a problem.

Under these circumstances, it is desirable that, in order to detect large defocus, a focus detection pixel having an opening width smaller than that of the focus detection pixel A and the focus detection pixel B (hereinafter referred to as a "large-DF detection pixel" as appropriate) should be provided in the image sensor. Also in this case, as described above, it is desirable that a plurality of exit pupil distances should be assumed, and a group of large-DF detection pixels having pupil division patterns most suitable for the respective exit pupil detection distances should be provided on the image sensor. An embodiment of the present disclosure which has been made with the above in mind will be described in detail.

1. Embodiments

"High-Accuracy Focus Detection Pixel and Large-DF Detection Pixel"

Figure 2B:
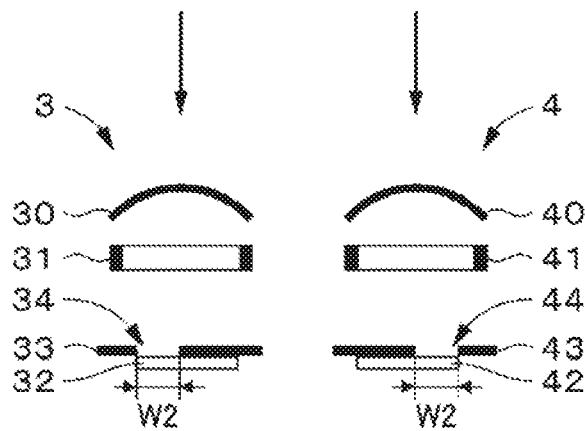

Next, a pixel used for detection of focus (referred to as a "high-accuracy focus detection pixel") and the large-DF detection pixel will be described. FIG. 2A is a diagram for describing a configuration example of the high-accuracy focus detection pixel. FIG. 2B is a diagram for describing a configuration example of the large-DF detection pixel. In FIG. 2A and FIG. 2B, a pair of high-accuracy focus detection pixels (high-accuracy focus detection pixel pair) and a pair of large-DF detection pixels (large-DF detection pixel pair) are shown.

In FIG. 2A, a high-accuracy focus detection pixel 1 has a configuration in which an on-chip lens 10, a color filter 11, and a photodiode 12 are formed in that order in a direction in which light enters through an imaging lens (indicated by an arrow). A portion of the photodiode 12 is shielded from light by a light shield mask 13. An opening 14 is formed as a portion of the photodiode 12 which is not shielded from light by the light shield mask 13. The opening width of the opening 14 is, for example, a width W1.

A high-accuracy focus detection pixel 2 which is paired with the high-accuracy focus detection pixel 1 also has a configuration in which an on-chip lens 20, a color filter 21, and a photodiode 22 are formed in that order in a direction in which light enters through an imaging lens (indicated by an arrow). A portion of the photodiode 22 is shielded from light by a light shield mask 23. An opening 24 is formed as a portion of the photodiode 22 which is not shielded from light by the light shield mask 23. The opening width of the opening 24 is, for example, a width W1 which is similar to the opening width of the opening 14.

In FIG. 2B, a large-DF detection pixel 3 has a configuration in which an on-chip lens 30, a color filter 31, and a photodiode 32 are formed in that order in a direction in which light enters through an imaging lens (indicated by an arrow). A portion of the photodiode 32 is shielded from light by a light shield mask 33. An opening 34 is formed as a portion of the photodiode 32 which is not shielded from light by the light shield mask 33. The opening width of the opening 34 is, for example, a width W2.

A large-DF detection pixel 4 which is paired with the large-DF detection pixel 3 also has a configuration in which an on-chip lens 40, a color filter 41, and a photodiode 42 are formed in that order in a direction in which light enters through an imaging lens (indicated by an arrow). A portion of the photodiode 42 is shielded from light by a light shield mask 43. An opening 44 is formed as a portion of the photodiode 42 which is not shielded from light by the light shield mask 43. The opening width of the opening 44 is, for example, a width W2 which is similar to the opening width of the opening 34. The opening width of a large-DF detection pixel is set to be smaller than the opening width of a high-accuracy focus detection pixel. Specifically, the following relationship is satisfied which is represented by:

$$W2 < W1 \quad (1)$$

Note that the opening widths W1 of the high-accuracy focus detection pixel 1 and the high-accuracy focus detection pixel 2 are not invariable. For example, the opening widths W1 of the high-accuracy focus detection pixels 1 may be different from each other depending on the position of the image sensor where the high-accuracy focus detection pixel 1 is located (the same is true of the high-accuracy focus detection pixel 2). More specifically, the opening width W1 of the high-accuracy focus detection pixel 1 may become longer or shorter as the position of the high-accuracy focus detection pixel 1 is further away from the left toward the right through the center on a line of the image sensor. Also in this case, the opening width W2 of the large-DF detection pixel is set so that the above relationship represented by expression (1) is satisfied. Note that the opening width W2 of the large-DF detection pixel is invariable, for example, irrespective of the position of the large-DF detection pixel.

"Difference in Opening Position"

Next, the position of the opening (opening position) of a focus detection pixel will be described. In an embodiment of the present disclosure, focus detection pixels have different opening positions for different exit pupil distances, and produce different pupil division patterns.

In an embodiment of the present disclosure, there are the following settings for the exit pupil distance: a short exit pupil distance D1; an intermediate exit pupil distance D2; and a long exit pupil distance D3. Specifically, these exit pupil distances satisfy the following relationship represented by:

$$D1 < D2 < D3 \quad (2)$$

FIGS. 3(A), 3(B), 3(C) and 3(D) are diagrams schematically showing a high-accuracy focus detection pixel and a large-DF detection pixel provided in an image sensor. Note that FIGS. 3(A), 3(B), 3(C) and 3(D) shows no normal pixels for the sake of convenience. Normal pixels are pixels which are arranged in a substantially matrix shape and are used to acquire an image. Normal pixels are arranged in a matrix shape, except for positions where large-DF detection pixel pairs are provided.

FIG. 3A shows a line L1 including high-accuracy focus detection pixel pairs having a pupil division pattern for the exit pupil distance D1. Although FIG. 3A shows nine high-accuracy focus detection pixel pairs on the line L1, the present disclosure is, of course, not limited to this. For example, a high-accuracy focus detection pixel pair (a high-accuracy focus detection pixel 100 and a high-accuracy focus detection pixel 110) is located on a left side of the sensor surface. A high-accuracy focus detection pixel pair (a high-accuracy focus detection pixel 120 and a high-accuracy focus detection pixel 130) is located at a center of the sensor surface. A high-accuracy focus detection pixel pair (a high-accuracy focus detection pixel 140 and a high-accuracy focus detection pixel 150) is located on a right side of the sensor surface.

The high-accuracy focus detection pixels have their respective opening positions. For example, the high-accuracy focus detection pixel 100 has an opening position a1, and the high-accuracy focus detection pixel 110, paired with the high-accuracy focus detection pixel 100, has an opening position b1. For example, the high-accuracy focus detection pixel 120 has an opening position a5, and the high-accuracy focus detection pixel 130, paired with the high-accuracy focus detection pixel 120, has an opening position b5. For example, the high-accuracy focus detection pixel 140 has an opening position a9, and the high-accuracy focus detection pixel 150, paired with the high-accuracy focus detection pixel 140, has an opening position b9.

Here, the opening positions of high-accuracy focus detection pixels provided on the line L1 will be described with reference to FIGS. 4(A), 4(B) and (C). FIG. 4A shows a configuration example of the high-accuracy focus detection pixel 100 and the high-accuracy focus detection pixel 110. FIG. 4B shows a configuration example of the high-accuracy focus detection pixel 120 and the high-accuracy focus detection pixel 130. FIG. 4C shows a configuration example of the high-accuracy focus detection pixel 140 and the high-accuracy focus detection pixel 150.

The high-accuracy focus detection pixel 100 includes an on-chip lens 101, a color filter 102, and a photodiode 103, which are arranged in that order in a direction in which light enters. A portion of the photodiode 103 is shielded from light by a light shield mask 104 being located at an appropriate position to form an opening 105. A hatched range schematically shows a range within which the photodiode 103 of the high-accuracy focus detection pixel 100 receives light.

The high-accuracy focus detection pixel 110 includes an on-chip lens 111, a color filter 112, and a photodiode 113, which are arranged in that order in a direction in which light enters. A portion of the photodiode 113 is shielded from light by a light shield mask 114 being located at an appropriate position to form an opening 115. A hatched range schematically shows a range within which the photodiode 113 of the high-accuracy focus detection pixel 110 receives light.

The high-accuracy focus detection pixel 120 includes an on-chip lens 121, a color filter 122, and a photodiode 123, which are arranged in that order in a direction in which light enters. A portion of the photodiode 123 is shielded from light by a light shield mask 124 being located at an appropriate position to form an opening 125. A hatched range schematically shows a range within which the photodiode 123 of the high-accuracy focus detection pixel 120 receives light.

The high-accuracy focus detection pixel 130 includes an on-chip lens 131, a color filter 132, and a photodiode 133, which are arranged in that order in a direction in which light enters. A portion of the photodiode 133 is shielded from light by a light shield mask 134 being located at an appropriate position to form an opening 135. A hatched range schematically shows a range within which the photodiode 133 of the high-accuracy focus detection pixel 130 receives light.

The high-accuracy focus detection pixel 140 includes an on-chip lens 141, a color filter 142, and a photodiode 143, which are arranged in that order in a direction in which light enters. A portion of the photodiode 143 is shielded from light by a light shield mask 144 being located at an appropriate position to form an opening 145. A hatched range schematically shows a range within which the photodiode 143 of the high-accuracy focus detection pixel 140 receives light.

The high-accuracy focus detection pixel 150 includes an on-chip lens 151, a color filter 152, and a photodiode 153, which are arranged in that order in a direction in which light enters. A portion of the photodiode 153 is shielded from light by a light shield mask 154 being located at an appropriate position to form an opening 155. A hatched range schematically shows a range within which the photodiode 153 of the high-accuracy focus detection pixel 150 receives light.

The positions of the light shield masks relative to the on-chip lens or the color filter are different from each other depending on the position of the sensor surface where a high-accuracy focus detection pixel is located. Therefore, the opening positions are different from each other depending on the position of the sensor surface where a high-accuracy focus detection pixel is located. As a result, when the imaging lens has an assumed exit pupil distance, the photodiodes of a high-accuracy focus detection pixel pair can receive substantially equal amounts of light irrespective of the position where the high-accuracy focus detection pixel pair is located on the image sensor.

In an embodiment of the present disclosure, the opening position is defined as a position of the light shield mask relative to the color filter, for example. Specifically, the opening position of one high-accuracy focus detection pixel of a high-accuracy focus detection pixel pair is determined by a length between a left end portion of the effective region of the color filter and a right end portion of the light shield mask, and the opening position of the other high-accuracy focus detection pixel is determined by a length between a right end portion of the effective region of the color filter and a left end portion of the light shield mask.

In the case of the high-accuracy focus detection pixel 100, the opening position a1 of the high-accuracy focus detection pixel 100 is determined by a length between a left end portion of the color filter 102 and a right end portion of the light shield mask 104. In the case of the high-accuracy focus detection pixel 110, the opening position b1 of the high-accuracy focus detection pixel 110 is determined by a length between a right end portion of the color filter 112 and a left end portion of the light shield mask 114.

In the case of the high-accuracy focus detection pixel 120, the opening position a5 of the high-accuracy focus detection pixel 120 is determined by a length between a left end portion of the color filter 122 and a right end portion of the light shield mask 124. In the case of the high-accuracy focus detection pixel 130, the opening position b5 of the high-accuracy focus detection pixel 130 is determined by a length between a right end portion of the color filter 132 and a left end portion of the light shield mask 134.

In the case of the high-accuracy focus detection pixel 140, the opening position a9 of the high-accuracy focus detection pixel 140 is determined by a length between a left end portion of the color filter 142 and a right end portion of the light shield mask 144. In the case of the high-accuracy focus detection pixel 150, the opening position b9 of the high-accuracy focus detection pixel 150 is determined by a length between a right end portion of the color filter 152 and a left end portion of the light shield mask 154. Note that the opening positions of the other high-accuracy focus detection pixels provided on the line L1 are similarly determined.

The opening positions of high-accuracy focus detection pixel pairs provided on the line L1 are different from each other depending on the position of the sensor surface, according to a pupil division pattern for the exit pupil distance D1. Specifically, there is a difference α between each opening position. The difference α is determined by the absolute value of the difference between each opening position, for example. Specifically, the difference α is determined by the absolute value of the difference between the opening position a1 and the opening position a2 or the absolute value of the difference between the opening position b1 and the opening position b2. Note that the difference α is not limited to the difference in the length, or alternatively, may be determined by the absolute value of the change rate of the length, or the like. The difference α is not limited to the difference between the opening positions of adjacent high-accuracy focus detection pixel pairs. For example, the difference α may be determined by the absolute value of the difference between the opening position a1 and the opening position a5 or the absolute value of the difference between the opening position b1 and the opening position b5.

Referring back to FIGS. 3(A), 3(B), 3(C) and 3(D), FIG. 3B shows a line L2 including high-accuracy focus detection pixel pairs having a pupil division pattern for the exit pupil distance D2. Although FIG. 3B shows nine high-accuracy focus detection pixel pairs on the line L2, the present disclosure is, of course, not limited to this. For example, a high-accuracy focus detection pixel pair (a high-accuracy focus detection pixel 160 and a high-accuracy focus detection pixel 170) is provided on a left side of the sensor surface, a high-accuracy focus detection pixel pair (a high-accuracy focus detection pixel 180 and a high-accuracy focus detection pixel 190) is provided at a center of the sensor surface, and a high-accuracy focus detection pixel pair (a high-accuracy focus detection pixel 200 and a high-accuracy focus detection pixel 210) is provided on a right side of the sensor surface. A plurality of high-accuracy focus detection pixel pairs corresponding to the exit pupil distance D2 are provided to form high-accuracy focus detection pixel pairs.

The high-accuracy focus detection pixels have their respective opening positions. For example, the high-accuracy focus detection pixel 160 has an opening position c1, and the high-accuracy focus detection pixel 170, paired with the high-accuracy focus detection pixel 160, has an opening position d1. For example, the high-accuracy focus detection pixel 180 has an opening position c5, and the high-accuracy focus detection pixel 190, paired with the high-accuracy focus detection pixel 180, has an opening position d5. For example, the high-accuracy focus detection pixel 200 has an opening position c9, and the high-accuracy focus detection pixel 210, paired with the high-accuracy focus detection pixel 200, has an opening position d9.

Here, the opening positions of high-accuracy focus detection pixels provided on the line L2 will be described with reference to FIGS. 5A, 5B, and 5C. FIG. 5A shows a configuration example of the high-accuracy focus detection pixel 160 and the high-accuracy focus detection pixel 170. FIG. 5B shows a configuration example of the high-accuracy focus detection pixel 180 and the high-accuracy focus detection pixel 190. FIG. 5C shows a configuration example of the high-accuracy focus detection pixel 200 and the high-accuracy focus detection pixel 210.

The high-accuracy focus detection pixel 160 includes an on-chip lens 161, a color filter 162, and a photodiode 163, which are arranged in that order in a direction in which light enters. A portion of the photodiode 163 is shielded from light by a light shield mask 164 being located at an appropriate position to form an opening 165. A hatched range schematically shows a range within which the photodiode 163 of the high-accuracy focus detection pixel 160 receives light.

The high-accuracy focus detection pixel 170 includes an on-chip lens 171, a color filter 172, and a photodiode 173, which are arranged in that order in a direction in which light enters. A portion of the photodiode 173 is shielded from light by a light shield mask 174 being located at an appropriate position to form an opening 175. A hatched range schematically shows a range within which the photodiode 173 of the high-accuracy focus detection pixel 170 receives light.

The high-accuracy focus detection pixel 180 includes an on-chip lens 181, a color filter 182, and a photodiode 183, which are arranged in that order in a direction in which light enters. A portion of the photodiode 183 is shielded from light by a light shield mask 184 being located at an appropriate position to form an opening 185. A hatched range schematically shows a range within which the photodiode 183 of the high-accuracy focus detection pixel 180 receives light.

The high-accuracy focus detection pixel 190 includes an on-chip lens 191, a color filter 192, and a photodiode 193, which are arranged in that order in a direction in which light enters. A portion of the photodiode 193 is shielded from light by a light shield mask 194 being located at an appropriate position to form an opening 195. A hatched range schematically shows a range within which the photodiode 193 of the high-accuracy focus detection pixel 190 receives light.

The high-accuracy focus detection pixel 200 includes an on-chip lens 201, a color filter 202, and a photodiode 203, which are arranged in that order in a direction in which light enters. A portion of the photodiode 203 is shielded from light by a light shield mask 204 being located at an appropriate position to form an opening 205. A hatched range schematically shows a range within which the photodiode 203 of the high-accuracy focus detection pixel 200 receives light.

The high-accuracy focus detection pixel 210 includes an on-chip lens 211, a color filter 212, and a photodiode 213, which are arranged in that order in a direction in which light enters. A portion of the photodiode 213 is shielded from light by a light shield mask 214 being located at an appropriate position to form an opening 215. A hatched range schematically shows a range within which the photodiode 213 of the high-accuracy focus detection pixel 210 receives light.

As described above, in an embodiment of the present disclosure, the opening position is defined as a position of the light shield mask relative to the color filter, for example. In the case of the high-accuracy focus detection pixel 160, the opening position c1 of the high-accuracy focus detection pixel 160 is determined by a length between a left end portion of the color filter 162 and a right end portion of the light shield mask 164. In the case of the high-accuracy focus detection pixel 170, the opening position d1 of the high-accuracy focus detection pixel 170 is determined by a length between a right end portion of the color filter 172 and a left end portion of the light shield mask 174.

In the case of the high-accuracy focus detection pixel 180, the opening position c5 of the high-accuracy focus detection pixel 180 is determined by a length between a left end portion of the color filter 182 and a right end portion of the light shield mask 184. In the case of the high-accuracy focus detection pixel 190, the opening position d5 of the high-accuracy focus detection pixel 190 is determined by a length between a right end portion of the color filter 192 and a left end portion of the light shield mask 194.

In the case of the high-accuracy focus detection pixel 200, the opening position c9 of the high-accuracy focus detection pixel 200 is determined by a length between a left end portion of the color filter 202 and a right end portion of the light shield mask 204. In the case of the high-accuracy focus detection pixel 210, the opening position d9 of the high-accuracy focus detection pixel 210 is determined by a length between a right end portion of the color filter 212 and a left end portion of the light shield mask 214. Note that the opening positions of the other high-accuracy focus detection pixels provided on the line L2 are similarly determined.

The opening positions of high-accuracy focus detection pixel pairs provided on the line L2 are different from each other depending on the position of the sensor surface, according to a pupil division pattern for the exit pupil distance D2. Specifically, there is a distance $\beta$ between each opening position, which is smaller than the difference $\alpha$. The difference $\beta$ is determined by the absolute value of the difference in length between each opening position, for example. Specifically, the difference $\beta$ is determined by the absolute value of the difference between the opening position c1 and the opening position c2 or the absolute value of the difference between the opening position d1 and the opening position d2. Note that the difference $\beta$ is not limited to the difference between each opening position, or alternatively, may be determined by the absolute value of the change rate of the opening position, or the like. The difference $\beta$ is not limited to the difference between the opening positions of adjacent high-accuracy focus detection pixel pairs. For example, the difference $\beta$ may be determined by the absolute value of the difference between the opening position c1 and the opening position c5 or the absolute value of the difference between the opening position d1 and the opening position d5.

Referring back to FIGS. 3(A), 3(B), 3(C) and 3(D), FIG. 3C shows a line L3 including high-accuracy focus detection pixel pairs having a pupil division pattern for the exit pupil distance D3. Although FIG. 3C shows nine high-accuracy focus detection pixel pairs on the line L3, the present disclosure is, of course, not limited to this. For example, a high-accuracy focus detection pixel pair (a high-accuracy focus detection pixel 220 and a high-accuracy focus detection pixel 230) is provided on a left side of the sensor surface, a high-accuracy focus detection pixel pair (a high-accuracy focus detection pixel 240 and a high-accuracy focus detection pixel 250) is provided at a center of the sensor surface, and a high-accuracy focus detection pixel pair (a high-accuracy focus detection pixel 260 and a high-accuracy focus detection pixel 270) is provided on a right side of the sensor surface. A plurality of high-accuracy focus detection pixel pairs corresponding to the exit pupil distance D3 are provided to form high-accuracy focus detection pixel pairs.

The high-accuracy focus detection pixels have their respective opening positions. For example, the high-accuracy focus detection pixel 220 has an opening position e1, and the high-accuracy focus detection pixel 230, paired with the high-accuracy focus detection pixel 220, has an opening position f1. For example, the high-accuracy focus detection pixel 240 has an opening position e5, and the high-accuracy focus detection pixel 250, paired with the high-accuracy focus detection pixel 240, has an opening position f5. For example, the high-accuracy focus detection pixel 260 has an opening position e9, and the high-accuracy focus detection pixel 270, paired with the high-accuracy focus detection pixel 260, has an opening position f9.

Here, the opening positions of high-accuracy focus detection pixels provided on the line L3 will be described with reference to FIGS. 6(A), 6(B) and 6(C). FIG. 6A shows a configuration example of the high-accuracy focus detection pixel 220 and the high-accuracy focus detection pixel 230. FIG. 6B shows a configuration example of the high-accuracy focus detection pixel 240 and the high-accuracy focus detection pixel 250. FIG. 6C shows a configuration example of the high-accuracy focus detection pixel 260 and the high-accuracy focus detection pixel 270.

The high-accuracy focus detection pixel 220 includes an on-chip lens 221, a color filter 222, and a photodiode 223, which are arranged in that order in a direction in which light enters. A portion of the photodiode 223 is shielded from light by a light shield mask 224 being located at an appropriate position to form an opening 225. A hatched range schematically shows a range within which the photodiode 223 of the high-accuracy focus detection pixel 220 receives light.

The high-accuracy focus detection pixel 230 includes an on-chip lens 231, a color filter 232, and a photodiode 233, which are arranged in that order in a direction in which light enters. A portion of the photodiode 233 is shielded from light by a light shield mask 234 being located at an appropriate position to form an opening 235. A hatched range schematically shows a range within which the photodiode 233 of the high-accuracy focus detection pixel 230 receives light.

The high-accuracy focus detection pixel 240 includes an on-chip lens 241, a color filter 242, and a photodiode 243, which are arranged in that order in a direction in which light enters. A portion of the photodiode 243 is shielded from light by a light shield mask 244 being located at an appropriate position to form an opening 245. A hatched range schematically shows a range within which the photodiode 243 of the high-accuracy focus detection pixel 240 receives light.

The high-accuracy focus detection pixel 250 includes an on-chip lens 251, a color filter 252, and a photodiode 253, which are arranged in that order in a direction in which light enters. A portion of the photodiode 253 is shielded from light by a light shield mask 254 being located at an appropriate position to form an opening 255. A hatched range schematically shows a range within which the photodiode 253 of the high-accuracy focus detection pixel 250 receives light.

The high-accuracy focus detection pixel 260 includes an on-chip lens 261, a color filter 262, and a photodiode 263, which are arranged in that order in a direction in which light enters. A portion of the photodiode 263 is shielded from light by a light shield mask 264 being located at an appropriate position to form an opening 265. A hatched range schematically shows a range within which the photodiode 263 of the high-accuracy focus detection pixel 260 receives light.

The high-accuracy focus detection pixel 270 includes an on-chip lens 271, a color filter 272, and a photodiode 273, which are arranged in that order in a direction in which light enters. A portion of the photodiode 273 is shielded from light by a light shield mask 274 being located at an appropriate position to form an opening 275. A hatched range schematically shows a range within which the photodiode 273 of the high-accuracy focus detection pixel 270 receives light.

As described above, in an embodiment of the present disclosure, the opening position is defined as a position of the light shield mask relative to the color filter, for example. In the case of the high-accuracy focus detection pixel 220, the opening position e1 of the high-accuracy focus detection pixel 220 is determined by a length between a left end portion of the color filter 222 and a right end portion of the light shield mask 224. In the case of the high-accuracy focus detection pixel 230, the opening position f1 of the high-accuracy focus detection pixel 230 is determined by a length between a right end portion of the color filter 232 and a left end portion of the light shield mask 234.

In the case of the high-accuracy focus detection pixel 240, the opening position e5 of the high-accuracy focus detection pixel 240 is determined by a length between a left end portion of the color filter 242 and a right end portion of the light shield mask 244. In the case of the high-accuracy focus detection pixel 250, the opening position f5 of the high-accuracy focus detection pixel 250 is determined by a length between a right end portion of the color filter 252 and a left end portion of the light shield mask 254.

In the case of the high-accuracy focus detection pixel 260, the opening position e9 of the high-accuracy focus detection pixel 260 is determined by a length between a left end portion of the color filter 262 and a right end portion of the light shield mask 264. In the case of the high-accuracy focus detection pixel 270, the opening position f9 of the high-accuracy focus detection pixel 270 is determined by a length between a right end portion of the color filter 272 and a left end portion of the light shield mask 274. Note that the opening positions of the other high-accuracy focus detection pixels provided on the line L3 are similarly determined.

The opening positions of high-accuracy focus detection pixel pairs provided on the line L3 are different from each other depending on the position of the sensor surface, according to a pupil division pattern for the exit pupil distance D2. Specifically, there is a distance $\gamma$ between each opening position, which is smaller than the difference $\beta$. The difference $\gamma$ is determined by the absolute value of the difference between each opening position, for example. Specifically, the difference $\gamma$ is determined by the absolute value of the difference between the opening position e1 and the opening position e2 or the absolute value of the difference between the opening position f1 and the opening position f2. Note that the difference $\gamma$ is not limited to the difference between each opening position, or alternatively, may be determined by the absolute value of the change rate of the opening position, or the like. The difference $\gamma$ is not limited to the difference between the opening positions of adjacent high-accuracy focus detection pixel pairs. For example, the difference $\gamma$ may be determined by the absolute value of the difference between the opening position e1 and the opening position e5 or the absolute value of the difference between the opening position f1 and the opening position f5.

As described above, pupil division patterns for a plurality of exit pupil distances are set so that the difference between opening positions decreases with an increase in the assumed (targeted) exit pupil distance. As a result, even when there are a plurality of exit pupil distances, focus detection pixel pairs on a predetermined line can receive substantially equal amounts of light.

Referring back to FIGS. 3(A), 3(B), 3(C) and 3(D), FIG. 3D shows a line L4 including large-DF detection pixels. As described in detail below, in the case of large-DF detection pixels, large-DF detection pixel pairs having pupil division patterns for different exit pupil distances are provided on the same line L4. In an embodiment of the present disclosure, as with high-accuracy focus detection pixels, there are the following settings of the exit pupil distance: the short exit pupil distance D1; the intermediate exit pupil distance D2; and the long exit pupil distance D3.

For example, a large-DF detection pixel pair having a pupil division pattern for the exit pupil distance D1 (e.g., a large-DF detection pixel 280 and a large-DF detection pixel 290), a large-DF detection pixel pair having a pupil division pattern for the exit pupil distance D2 (e.g., a large-DF detection pixel 281 and a large-DF detection pixel 291), and a large-DF detection pixel pair having a pupil division pattern for the exit pupil distance D3 (e.g., a large-DF detection pixel 282 and a large-DF detection pixel 292), are alternately arranged on the line L4 in the horizontal direction.

The large-DF detection pixels have their respective opening positions. The opening positions can be similar to those of the above high-accuracy focus detection pixels. For example, the large-DF detection pixel 280 has an opening position g1, and the large-DF detection pixel 290 has an opening position h1. The large-DF detection pixel pairs corresponding to the exit pupil distance D1 have an opening position g2, an opening position h2, an opening position g3, and an opening position h3, respectively. A plurality of large-DF focus pixel pairs corresponding to the exit pupil distance D1 are provided to form large-DF detection pixel pairs.

For example, the large-DF detection pixel 281 has an opening position i1, and the large-DF detection pixel 291 has an opening position j1. Other large-DF detection pixel pairs corresponding to the exit pupil distance D2 similarly have an opening position i2, an opening position j2, an opening position i3, and an opening position j3, respectively. A plurality of large-DF focus pixel pairs corresponding to the exit pupil distance D2 are provided to form large-DF detection pixel pairs.

For example, the large-DF detection pixel 282 has an opening position k1, and the large-DF detection pixel 292 has an opening position l1. Other large-DF detection pixel pairs corresponding to the exit pupil distance D3 similarly have an opening position k2, an opening position l2, an opening position k3, and an opening position l3, respectively. Note that a plurality of large-DF focus pixel pairs corresponding to the exit pupil distance D3 are provided to form large-DF detection pixel pairs.

The large-DF detection pixel pairs corresponding to the exit pupil distance D1 have different opening positions according to a pupil division pattern for the exit pupil distance D1. Specifically, there is a difference X between each of the opening positions of the large-DF detection pixels. For example, the difference X is determined by the absolute value of the difference between the opening position g1 and the opening position g2 or the absolute value of the difference between the opening position h1 and the opening position h2. Note that the difference X is not limited to the difference between each opening position, or alternatively, may be determined by the absolute value of the change rate of the opening position, or the like. Also, the difference X is not limited to the difference between the opening positions of adjacent large-DF detection pixels. For example, the difference X may be determined by the absolute value of the difference between the opening position g1 and the opening position g3 or the absolute value of the difference between the opening position h1 and the opening position h3.

The large-DF detection pixel pairs corresponding to the exit pupil distance D2 have different opening positions according to a pupil division pattern for the exit pupil distance D2. Specifically, there is a difference Y between each of the opening positions of the large-DF detection pixels, which is smaller than the difference X. For example, the difference Y is determined by the absolute value of the difference between the opening position i1 and the opening position i2 or the absolute value of the difference between the opening position j1 and the opening position j2. Note that the difference Y is not limited to the difference between each opening position, or alternatively, may be determined by the absolute value of the change rate of the opening position, or the like. Also, the difference Y is not limited to the difference between the opening positions of adjacent large-DF detection pixels. For example, the difference Y may be determined by the absolute value of the difference between the opening position i1 and the opening position i3 or the absolute value of the difference between the opening position j1 and the opening position j3.

The large-DF detection pixel pairs corresponding to the exit pupil distance D3 have different opening positions according to a pupil division pattern for the exit pupil distance D3. Specifically, there is a difference Z between each of the opening positions of the large-DF detection pixels, which is smaller than the difference Y. For example, the difference Z is determined by the absolute value of the difference between the opening position k1 and the opening position k2 or the absolute value of the difference between the opening position l1 and the opening position l2. Note that the difference Z is not limited to the difference between each opening position, or alternatively, may be determined by the absolute value of the change rate of the opening position, or the like. Also, the difference Z is not limited to the difference between the opening positions of adjacent large-DF detection pixels. For example, the difference Z may be determined by the absolute value of the difference between the opening position g1 and the opening position g3 or the absolute value of the difference between the opening position h1 and the opening position h3.

Note that although, in the above example, high-accuracy focus detection pixels and large-DF detection pixels are configured for the same exit pupil distance, high-accuracy focus detection pixels and large-DF detection pixels may be configured for different exit pupil distances. Furthermore, the differences in opening position (e.g., the difference α and the difference X, the difference β and the difference Y, or the difference γ and the difference Z) may be the same or different for the same exit pupil distance.

"Image Sensor in One Embodiment"

Figure 7:
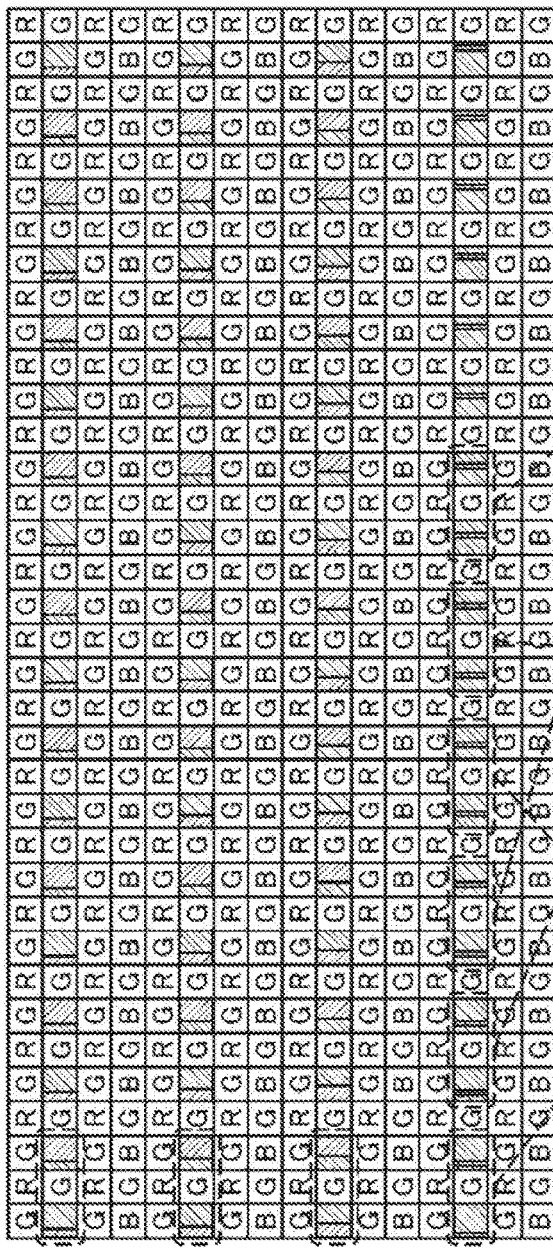
FIG. 7 is a diagram for describing a pixel array example of an image sensor in an embodiment of the present disclosure.

FIG. 7 is a diagram for describing an example of the pixel arrangement of an image sensor in an embodiment of the present disclosure. Note that the pixel arrangement shown in FIG. 7 is a portion of, but not all, the image sensor.

As shown in FIG. 7, the image sensor includes normal pixels, and high-accuracy focus detection lines on which a plurality of high-accuracy focus detection pixel pairs are provided. The image sensor also includes a large-defocus detection line on which a plurality of large-DF detection pixel pairs are provided. The image sensor has high-accuracy focus detection lines L5, L6, and L7 and a large-defocus detection line L8.

Note that if all pixels provided on a high-accuracy focus detection line are a high-accuracy focus detection pixel, a captured image is likely to have low image quality. Therefore, a normal pixel is preferably provided between high-accuracy focus detection pixels. Meanwhile, if there is an excessive distance between the two high-accuracy focus detection pixels of a high-accuracy focus detection pixel pair, the focus detection accuracy is likely to decrease. Therefore, high-accuracy focus detection pixels are preferably provided relatively densely in the horizontal direction. In view of this, for example, about one to three normal pixels are preferably provided between high-accuracy focus detection pixels. By providing normal pixels between high-accuracy focus detection pixels, the decrease in image quality of a captured image can be prevented. The same is true of the arrangement of pixels on the large-defocus detection line.

On the high-accuracy focus detection line L5, high-accuracy focus detection pixel pairs having opening positions which are different from each other depending on the position of the sensor surface, according to the exit pupil distance D1, are provided. On the high-accuracy focus detection line L6, which is about several lines (e.g., four lines) away from the high-accuracy focus detection line L5 on the image sensor, high-accuracy focus detection pixel pairs having opening positions which are different from each other depending on the position of the sensor surface, according to the exit pupil distance D2, are provided. On the high-accuracy focus detection line L7, which is about several lines (e.g., four lines) away from the high-accuracy focus detection line L6 on the image sensor, high-accuracy focus detection pixel pairs having opening positions which are different from each other depending on the position of the sensor surface, according to the exit pupil distance D3, are provided.

On the large-defocus detection line L8, which is about several lines (e.g., four lines) away from the high-accuracy focus detection line L7, a plurality of large-DF detection pixel pairs are provided. Here, when large defocus occurs, it is only necessary to determine in which direction the focus is displaced. Therefore, it is less necessary to provide large-DF detection pixels densely in the horizontal direction. Therefore, it is less necessary to provide large-DF detection pixel pairs having different pupil division patterns on different lines, and large-DF detection pixel pairs having different pupil division patterns can be provided on the same single line. A plurality of large-DF detection pixel pairs are used in a case where the displacement of the focus is greater than a predetermined value.

For example, on the large-defocus detection line L8, large-DF detection pixel pairs having opening positions which are different from each other depending on the position of the sensor surface according to the exit pupil distance D1, large-DF detection pixel pairs having opening positions which are different from each other depending on the position of the sensor surface according to the exit pupil distance D2, and large-DF detection pixel pairs having opening positions which are different from each other depending on the position of the sensor surface according to the exit pupil distance D3, are alternately arranged. Thus, a plurality of large-DF detection pixel pairs provided on the large-defocus detection line L8 are configured as a plurality of exit pupil distance-supporting large-DF detection pixel pairs corresponding to different exit pupil distances. When a normal pixel (e.g., green (G)) is provided between each large-DF detection pixel, a repeating unit of 12 pixels is formed. The repeating unit is repeated a predetermined number of times.

For example, the pixel array including 16 lines shown in FIG. 7 is a repeating unit, and the repeating unit (pixel array) is repeatedly provided in the vertical direction. In other words, a large-defocus detection line is provided at intervals of a predetermined number of lines. The number of the repeating units provided on an image sensor is appropriately set, taking into account the image quality of a captured image or the focus detection accuracy.

As described above, for example, in an image sensor according to an embodiment of the present disclosure, high-accuracy focus detection pixel pairs having pupil division patterns for different exit pupil distances are provided on different lines of the image sensor. The outputs of the high-accuracy focus detection pixel pairs are selectively used according to the exit pupil distance of the lens, and therefore, the focus can be detected highly accurately. In addition, the large-DF detection pixel pairs are provided, and therefore, the focus can be detected highly accurately even if large defocus occurs. Furthermore, large-DF detection pixel pairs having pupil division patterns for different exit pupil distances are provided on the same line, and therefore, the decrease in the image quality of a captured image can be prevented.

For example, the above image sensor is provided in an imaging device. For example, the imaging device acquires information about an exit pupil distance from an imaging lens. The imaging device selects the output of a high-accuracy focus detection pixel pair (a large-DF detection pixel pair when large defocus occurs) having the acquired exit pupil distance or a pupil division pattern for the exit pupil distance, and performs focus detection.

2. Variations

In the foregoing, embodiments of the present disclosure have been specifically described. The present disclosure is not limited to the above embodiments. Various variations can be made on the basis of the technical features of the present disclosure.

The present disclosure is not limited to the pixel array in the above embodiments. Pixel arrays in a plurality of variations will now be described.
"Variation 1"

FIGS. 8(A), 8(B) and 8(C) and FIG. 9 are diagrams for describing a pixel array in Variant 1. Note that FIGS. 8(A), 8(B) and 8(C) and FIG. 9 show no normal pixels. FIG. 8A shows a line L10 including high-accuracy focus detection pixel pairs having a pupil division pattern for an exit pupil distance D7. The opening positions of each high-accuracy focus detection pixel pair provided on the line L10 are different from each other by a difference A10. Note that the opening positions of a high-accuracy focus detection pixel and a large-DF detection pixel can be determined as in the above embodiment.

FIG. 8B shows a line L11 on which a large-DF focus pixel pair having a pupil division pattern for the exit pupil distance D7 and a large-DF focus pixel pair having a pupil division pattern for an exit pupil distance D8 which is longer than the exit pupil distance D7 are alternately arranged. The opening positions of each large-DF focus pixel pair having a pupil division pattern for the exit pupil distance D7 are different from each other by a difference B10. The opening positions of each large-DF focus pixel pair having a pupil division pattern for the exit pupil distance D8 are different from each other by a difference C10. The difference B10 is greater than the difference C10.

FIG. 8C shows a line L12 including high-accuracy focus detection pixel pairs having a pupil division pattern for the exit pupil distance D8. The opening positions of each high-accuracy focus detection pixel pair provided on the line L12 are different from each other by a difference E10. The difference E10 is smaller than the difference A10.

FIG. 9A shows a line L13 including high-accuracy focus detection pixel pairs having a pupil division pattern for an exit pupil distance D9. The exit pupil distance D9 is longer than the exit pupil distance D7 and shorter than the exit pupil distance D8. The opening positions of each high-accuracy focus detection pixel pair provided on the line L13 are different from each other by a difference F10. The difference F10 is greater than the difference E10 and smaller than the difference A10.

FIG. 9B shows a line L14 on which a large-DF focus pixel pair having a pupil division pattern for the exit pupil distance D9 and a large-DF focus pixel pair having a pupil division pattern for an exit pupil distance D10 which is longer than the exit pupil distance D8 are alternately arranged. The opening positions of each large-DF focus pixel pair having a pupil division pattern for the exit pupil distance D9 are different from each other by a difference G10. The opening positions of each large-DF focus pixel pair having a pupil division pattern for the exit pupil distance D10 are different from each other by a difference H10. The difference G10 is smaller than the difference B10 and greater than the difference H10. Also, the difference H10 is smaller than the difference C10.

FIG. 9C shows a line L15 including high-accuracy focus detection pixel pairs having a pupil division pattern for the exit pupil distance D10. The opening positions of each high-accuracy focus detection pixel pair provided on the line L15 are different from each other by a difference I10. The difference I10 is smaller than the difference E10. The six phase difference detection lines shown in FIGS. 8(A), 8(B) and 8(C) and FIG. 9 form a repeating unit, and the repeating unit is repeated a predetermined number of times on an image sensor.

As in Variant 1 described above, the number of exit pupil distances is not limited to three, and may be four. The number of exit pupil distances to be dealt with can be set as appropriate. High-accuracy focus detection pixels and large-DF detection pixels having pupil division patterns for the set exit pupil distances are provided on an image sensor.

Also, as in the pixel array shown in Variant 1, a group of large-DF detection pixels having a pupil division pattern for each of two of the four exit pupil distances may be provided on a single line, while a group of large-DF detection pixels having a pupil division pattern for each of the other two of the four exit pupil distances may be provided on a single line different from the above line.

"Variation 2"

FIGS. 10(A), 10(B) and 10(C) and FIG. 11 are diagrams for describing a pixel array in Variant 2. Note that FIGS. 10(A), 10(B) and 10(C) and FIG. 11 show no normal pixels. FIG. 10A shows a line L20 including high-accuracy focus detection pixel pairs having a pupil division pattern for an exit pupil distance D15. The opening positions of each high-accuracy focus detection pixel pair provided on the line L20 are different from each other by a difference A20. Note that the opening positions of a high-accuracy focus detection pixel and a large-DF detection pixel can be determined as in the above embodiment.

FIG. 10B shows a line L21 on which a large-DF focus pixel pair having a pupil division pattern for the exit pupil distance D15, a large-DF focus pixel pair having a pupil division pattern for an exit pupil distance D16, and a large-DF focus pixel pair having a pupil division pattern for an exit pupil distance D17 are alternately arranged. The opening positions of each large-DF focus pixel group having a pupil division pattern for the exit pupil distance D15 are different from each other by a difference B20. The opening positions of each large-DF focus pixel group having a pupil division pattern for the exit pupil distance D16 are different from each other by a difference C20. The opening positions of each large-DF focus pixel group having a pupil division pattern for the exit pupil distance D17 are different from each other by a difference E20.

Here, for example, the exit pupil distance D15 is shorter than the exit pupil distance D16. Also, for example, the exit pupil distance D16 is shorter than the exit pupil distance D17. The difference B20 is greater than the difference C20. The difference C20 is greater than the difference E20.

FIG. 10C shows a line L22 including high-accuracy focus detection pixel pairs having a pupil division pattern for the exit pupil distance D16. The opening positions of each high-accuracy focus detection pixel pair provided on the line L22 are different from each other by a difference F20. The difference F20 is smaller than the difference A20.

FIG. 11A shows a line L23 on which a pixel array similar to that of the line L21 shown in FIG. 10B is formed. FIG. 11B shows a line L24 including high-accuracy focus detection pixel pairs having a pupil division pattern for the exit pupil distance D17. The opening positions of each high-accuracy focus detection pixel pair provided on the line L24 are different from each other by a difference G20. The difference G20 is smaller than the difference F20. FIG. 11C shows a line L25 on which a pixel array similar to that of the line L21 shown in FIG. 10B is formed. The six phase difference detection lines shown in FIGS. 10(A), 10(B) and 10(C) and FIG. 11 form a repeating unit, and the repeating unit is repeated a predetermined number of times on an image sensor. As in Variation 2, a group of large-DF detection pixels may be provided on two or more lines of the plurality of lines included in each repeating unit.

"Variation 3"

FIGS. 12(A), 12(B), 12(C) and 12(D) are diagrams for describing a pixel array in Variation 3. FIGS. 12(A), 12(B), 12(C) and 12(D) shows no normal pixels. Note that a relationship in magnitude or the like between exit pupil distances (exit pupil distances D1, D2, and D3) shown in FIGS. 12(A), 12(B), 12(C) and 12(D) is similar to that described above with reference to FIG. 3, and will not be redundantly described.

FIGS. 12(A), 12(B), 12(C) and 12(D), m and n indicate two opening positions possessed by each high-accuracy focus detection pixel provided on a line L1, o and p indicate two opening positions possessed by each high-accuracy focus detection pixel on a line L2, and q and r indicate two opening positions possessed by each high-accuracy focus detection pixel on a line L3. Also, s and t indicates two opening positions possessed by each large-DF detection pixel provided on a line L4.

Figure 13A:
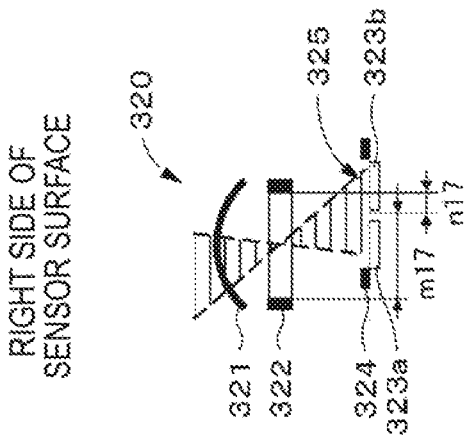
FIG. 13A, FIG. 13B, and FIG. 13C are diagrams for describing Variation 3.
Figure 13B:
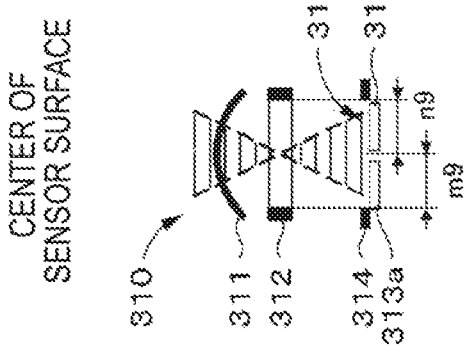
Figure 13C:
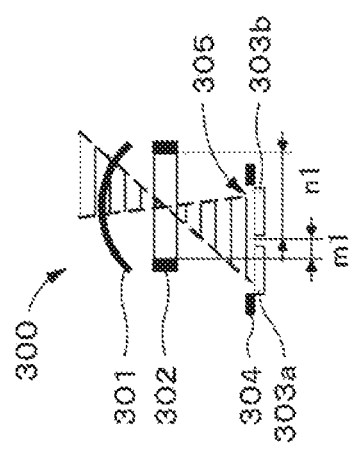

Here, an opening position example of a high-accuracy focus detection pixel having two photodiodes will be described with reference to FIGS. 13(A), 13(B) and 13(C). FIG. 13A shows a configuration example of one high-accuracy focus detection pixel (high-accuracy focus detection pixel 300) of a high-accuracy focus detection pixel pair located in the vicinity of the left side of the line L2. FIG. 13B shows a configuration example of one high-accuracy focus detection pixel (high-accuracy focus detection pixel 310) of a high-accuracy focus detection pixel pair located in the vicinity of the center of the line L2. FIG. 13C shows a configuration example of one high-accuracy focus detection pixel (high-accuracy focus detection pixel 320) of a high-accuracy focus detection pixel pair located in the vicinity of the right side of the line L2.

The high-accuracy focus detection pixel 300 includes an on-chip lens 301, a color filter 302, and photodiodes, which are arranged in that order in a direction in which light enters. A portion of the photodiodes is shielded from light by a light shield mask 304 being located at an appropriate position to form an opening 305. A hatched range schematically shows a range within which the two photodiodes of the high-accuracy focus detection pixel 300 receive light. The high-accuracy focus detection pixel 300 has the two photodiodes 303a and 303b.

The high-accuracy focus detection pixel 310 includes an on-chip lens 311, a color filter 312, and photodiodes, which are arranged in that order in a direction in which light enters. A portion of the photodiodes is shielded from light by a light shield mask 314 being located at an appropriate position to form an opening 315. A hatched range schematically shows a range within which the two photodiodes of the high-accuracy focus detection pixel 310 receive light. The high-accuracy focus detection pixel 310 has the two photodiodes 313a and 313b.

The high-accuracy focus detection pixel 320 includes an on-chip lens 321, a color filter 322, and photodiodes, which are arranged in that order in a direction in which light enters. A portion of the photodiodes 323 is shielded from light by a light shield mask 324 being located at an appropriate position to form an opening 325. A hatched range schematically shows a range within which the two photodiodes of the high-accuracy focus detection pixel 320 receive light. The high-accuracy focus detection pixel 320 has the two photodiodes 323a and 323b.

For example, the opening position is determined by a position of the light shield mask relative to the color filter. Specifically, one opening position is determined by a length between a left end portion of the effective region of the color filter and a boundary between the two photodiodes, and the other opening position is determined by a length between a right end portion of the effective region of the color filter and the boundary between the two photodiodes.

In the case of the high-accuracy focus detection pixel 300, an opening position m1 is determined by a length between a left end portion of the color filter 302 and a boundary between the two photodiodes, and an opening position n1 is determined by a length between a right end portion of the color filter 302 and the boundary between the two photodiodes. In the high-accuracy focus detection pixel 310, an opening position m9 is determined by a length between a left end portion of the color filter 312 and a boundary between the two photodiodes, and an opening position n9 is determined by a length between a right end portion of the color filter 312 and the boundary between the two photodiodes. In the case of the high-accuracy focus detection pixel 320, an opening position m17 is determined by a length between a left end portion of the color filter 322 and a boundary between the two photodiodes, and an opening position n17 is determined by a length between a right end portion of the color filter 312 and the boundary between the two photodiodes.

The high-accuracy focus detection pixels have different opening positions changing in a single direction (e.g., from left to right) on the line L2. Specifically, the opening position m increases by a predetermined difference from left to right on the line L2, and the opening position n decreases by a predetermined difference from left to right on the line L2. As described in the above embodiment, the difference between opening positions increases with a decrease in exit pupil distance and decreases with an increase in exit pupil distance.

An opening position example of a large-DF detection pixel having two photodiodes will be described with reference to FIGS. 14(A), 14(B) and 14(C). Note that, in the description that follows, the large-DF detection pixel is a large-DF detection pixel having a pupil division pattern for the exit pupil distance D2.

FIG. 14A shows a configuration example of one large-DF detection pixel (large-DF detection pixel 330) of a pair of large-DF detection pixels provided in the vicinity of the left side of the line L4. FIG. 14B shows a configuration example of one large-DF detection pixel (large-DF detection pixel 340) of a pair of large-DF detection pixels provided in the vicinity of the center of the line L4. FIG. 14C shows a configuration example of one large-DF detection pixel (large-DF detection pixel 350) of a pair of large-DF detection pixels provided in the vicinity of the right side of the line L4.

The configuration of the large-DF detection pixel is similar to that of the high-accuracy focus detection pixel, except that the opening width of the large-DF detection pixel is smaller than that of the high-accuracy focus detection pixel, and therefore, will not be redundantly described. The opening position of the large-DF detection pixel can be determined in a manner similar to that of the above high-accuracy focus detection pixel.

In the case of the large-DF detection pixel 330, an opening position s3 is determined by a length between a left end portion of a color filter 332 and a boundary between the two photodiodes, and an opening position t3 is determined by a length between a right end portion of the color filter 332 and the boundary between the two photodiodes. In the case of the large-DF detection pixel 340, an opening position s9 is determined by a length between a left end portion of a color filter 342 and a boundary between the two photodiodes, and an opening position t9 is determined by a length between a right end portion of the color filter 342 and the boundary between the two photodiodes. In the case of the large-DF detection pixel 350, an opening position s15 is determined by a length between a left end portion of a color filter 352 and a boundary between the two photodiodes, and an opening position t15 is determined by a length between a right end portion of the color filter 352 and the boundary between the two photodiodes.

The large-DF detection pixels have different opening positions changing in a direction (e.g., from left to right) on the line L4. Specifically, the relative order of magnitude of the opening positions s3, s9, and s15 is s3<s9<s15 with a predetermined difference between each opening position, and the relative order of magnitude of the opening positions t3, t9, and t15 is t3>t9>t15 with a predetermined difference between each opening position. The same is true of large-DF detection pixels corresponding to the other exit pupil distances. As described in the above embodiments, the difference between opening positions increases with a decrease in exit pupil distance and decreases with an increase in exit pupil distance.

As in Variation 3 described above, each high-accuracy focus detection pixel and each large-DF detection pixel may have a plurality of (e.g., two) photodiodes. Furthermore, an opening position may be determined for each photodiode.

"Other Variations"

Note that the configurations and processes in the embodiments and variations can be combined as appropriate unless a technical contradiction occurs. The order of steps in the illustrated process flows can be changed as appropriate unless a technical contradiction occurs.

The opening position is defined as a position of a light shield mask relative to a color filter in the above embodiments and the like of the present disclosure. If no color filter is used, the opening position may be defined as a position of a light shield mask relative to a component such as an on-chip lens or the like.

Additionally, the present technology may also be configured as below.

(1)

An image sensor including:
a plurality of large-defocus detection pixel pairs configured to be used when a displacement of a focus is greater than a predetermined value; and
a plurality of normal pixels arranged in a substantially matrix shape and configured to acquire an image, wherein a large-defocus detection line including the large-defocus detection pixel pairs is provided for each of a predetermined number of lines, and on each of the large-defocus detection lines, the plurality of large-defocus detection pixel pairs are configured as a plurality of exit pupil distance-supporting large-defocus detection pixel pairs corresponding to different exit pupil distances.

(2)

The image sensor according to (1), wherein an opening width of each of the large-defocus detection pixel pairs is smaller than an opening width of each of high-accuracy focus detection pixel pairs used for detection of focus.

(3)

The image sensor according to (1) or (2), wherein the large-defocus detection pixel pairs have opening positions, respectively, and the opening positions are different from each other depending on a position of a sensor surface according to a specific pupil division pattern.

(4)

The image sensor according to (2), wherein a high-accuracy focus detection line is provided in which a plurality of the high-accuracy focus detection pixel pairs are provided.

(5)

The image sensor according to (4), wherein the image sensor includes a plurality of the high-accuracy focus detection lines, and the high-accuracy detection pixel pairs on different high-accuracy focus detection lines are configured as exit pupil distance-supporting high-accuracy focus detection pixel pairs corresponding to different exit pupil distances.

(6)

The image sensor according to any one of (2), (4), and (5), wherein the high-accuracy focus detection pixel pairs have opening positions, respectively, and the opening positions are different from each other depending on a position of a sensor surface according to a specific pupil division pattern.

(7)

The image sensor according to any one of (1) to (6), wherein each of large-defocus detection pixels included in the large-defocus detection pixel pair has two photodiodes.

(8)

The image sensor according to any one of (2), (5), (6), and (7), wherein each of high-accuracy focus detection pixels included in the high-accuracy focus detection pixel pair has two photodiodes.

REFERENCE SIGNS LIST

1, 2 high-accuracy focus detection pixel
3, 4 large-DF detection pixel
a1, b1 opening position
W1, W2 opening width

The invention claimed is:

1. An image sensor, comprising:
a large-defocus detection line that includes a plurality of large-defocus detection pixel pairs, wherein the plurality of large-defocus detection pixel pairs is configured to be used based on a displacement of a focus that is greater than a specific value;
a plurality of normal pixels in a substantially matrix shape, wherein the plurality of normal pixels is configured to acquire an image, and
wherein the plurality of large-defocus detection pixel pairs of the large-defocus detection line includes a first exit pupil distance-supporting large-defocus detection pixel pair corresponding to a first exit pupil distance, and a second exit pupil distance-supporting large-defocus detection pixel pair corresponding to a second exit pupil distance; and
a plurality of high-accuracy focus detection pixel pairs configured to detect the focus, wherein
each pixel of a large-defocus detection pixel pair of the plurality of large-defocus detection pixel pairs includes a first photodiode,
each pixel of a high-accuracy focus detection pixel pair of the plurality of high-accuracy focus detection pixel pairs includes a second photodiode, and
a first opening width of a first unshielded portion of the first photodiode is smaller than a second opening width of a second unshielded portion of the second photodiode.

2. The image sensor according to claim 1, wherein
the plurality of large-defocus detection pixel pairs has a plurality of opening positions, and
a first opening position of the plurality of opening positions is different from a second opening position of the plurality of opening positions based on:
a position of a sensor surface of the image sensor, and
a specific pupil division pattern.

3. The image sensor according to claim 1, further comprising a high-accuracy focus detection line that includes the plurality of high-accuracy focus detection pixel pairs.

4. The image sensor according to claim 1, further comprising a plurality of high-accuracy focus detection lines that includes the plurality of high-accuracy focus detection pixel pairs,
wherein the plurality of high-accuracy focus detection pixel pairs on the plurality of high-accuracy focus detection lines includes a first exit pupil distance-supporting high-accuracy focus detection pixel pair corresponding to a third exit pupil distance, and a second exit pupil distance-supporting high-accuracy focus detection pixel pair corresponding to a fourth exit pupil distance.

5. The image sensor according to claim 1, wherein
the plurality of high-accuracy focus detection pixel pairs has a plurality of opening positions, and
a first opening position of the plurality of opening positions is different from a second opening position of the plurality of opening positions based on:
a position of a sensor surface of the image sensor, and
a specific pupil division pattern.

6. The image sensor according to claim 1, wherein each of large-defocus detection pixels included in each of the plurality of large-defocus detection pixel pairs comprises two photodiodes.

7. The image sensor according to claim 1, wherein each of high-accuracy focus detection pixels included in each of the plurality of high-accuracy focus detection pixel pairs comprises two photodiodes.

8. An image sensor, comprising:
a plurality of large-defocus detection pixel pairs, wherein the plurality of large-defocus detection pixel pairs is configured to be used based on a displacement of a focus that is greater than a specific value;

a plurality of normal pixels in a substantially matrix shape, wherein the plurality of normal pixels is configured to acquire an image;

a large-defocus detection line that includes the plurality of large-defocus detection pixel pairs, wherein the plurality of large-defocus detection pixel pairs on the large-defocus detection line includes a plurality of exit pupil distance-supporting large-defocus detection pixel pairs corresponding to different exit pupil distances; and a plurality of high-accuracy focus detection lines that includes a plurality of high-accuracy focus detection pixel pairs, wherein the plurality of high-accuracy focus detection pixel pairs on the plurality of high-accuracy focus detection lines includes a plurality of exit pupil distance-supporting high-accuracy focus detection pixel pairs corresponding to the different exit pupil distances.

* * * * *